United States Patent
Liu et al.

(10) Patent No.: US 11,967,225 B2
(45) Date of Patent: Apr. 23, 2024

(54) METHOD AND APPARATUS FOR IMPLEMENTING VIDEO CLICK BASED ON BLUETOOTH DEVICE

(71) Applicant: SHANGHAI BILIBILI TECHNOLOGY CO., LTD., Shanghai (CN)

(72) Inventors: Cong Liu, Shanghai (CN); Haifeng Wang, Shanghai (CN); Xian Lin, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 0 days.

(21) Appl. No.: 17/985,792

(22) Filed: Nov. 11, 2022

(65) Prior Publication Data

US 2023/0154311 A1    May 18, 2023

(30) Foreign Application Priority Data

Nov. 17, 2021   (CN) .......................... 202111360714.X (51) Int. Cl.
| | |
|---|---|
| G06F 15/16 | (2006.01) |
| G08C 17/02 | (2006.01) |
| H04L 67/12 | (2022.01) |
| H04W 76/14 | (2018.01) |

(52) U.S. Cl.
CPC .............. *G08C 17/02* (2013.01); *H04L 67/12* (2013.01); *H04W 76/14* (2018.02)

(58) Field of Classification Search
CPC ......... G08C 17/02; H04W 76/14; H04L 67/12
See application file for complete search history.

(56) References Cited

U.S. PATENT DOCUMENTS

| 11,637,915 | B1* | 4/2023 | Gordon | ............ H04M 1/72436 |
|---|---|---|---|---|
| | | | | 455/456.2 |
| 2019/0075340 | A1* | 3/2019 | Hochart | .................. H04L 51/02 |
| 2021/0136137 | A1* | 5/2021 | Munoz | .................. H04L 67/563 |

OTHER PUBLICATIONS

"Douyin Bluetooth remote control chip solution, Selfie Bluetooth chip solution" https://bajiahao.baidu.com/s?id=1665096562657605347; Baidu; Apr. 2020; accessed Jan. 24, 2024; 3 pages.

(Continued)

*Primary Examiner* — Normin Abedin
(74) *Attorney, Agent, or Firm* — BakerHostetler (57) ABSTRACT

The present disclosure provides techniques for implementing a video click via a Bluetooth device. The techniques comprise performing matching with and connection to a wireless device; monitoring a signal sent by the wireless device; parsing the signal and determining whether the signal is associated with a preset power-conserving wireless personal area network service; determining whether a terminal device is in a state of playing a video in response to determining that the signal is associated with the preset power-conserving wireless personal area network service; and in response to determining that the terminal device is in the state of playing the video, rendering an effect on the video played by the terminal device based on the signal and updating data based on the signal.

17 Claims, 4 Drawing Sheets

(56) References Cited

OTHER PUBLICATIONS

"The Bluetooth remote control of your mobile phone frees your hands to browse TikTok while lying down; taking selfies from a long-distance"; https:/www.zhihu.com/zvideo/1388776936836120576; Zhihu; Jun. 2021; accessed Jan. 24, 2024; 4 pages.

"An artifact that can remotely refresh Douyin"; https://www.zhihu.com/zvideo/1409901125147893760?utm_id=0; Zhihu; Aug. 2021; accessed Jan. 24, 2024; 3 pages.

* cited by examiner

Apparatus for implementing a video click based on a Bluetooth device 80

Connecting module 81

Monitoring module 82

Parsing module 83

Determination module 84

Rendering module 85

*FIG. 8*

Computer device 9

Memory 120

Network interface 122

Processor 121

*FIG. 9*

METHOD AND APPARATUS FOR IMPLEMENTING VIDEO CLICK BASED ON BLUETOOTH DEVICE

CROSS-REFERENCE TO RELATED APPLICATIONS

This application claims priority to Chinese Patent Application No. 202111360714.X, filed on Nov. 17, 2021, and entitled "METHOD AND APPARATUS FOR IMPLEMENTING VIDEO CLICK BASED ON BLUETOOTH DEVICE", which is incorporated herein by reference in its entirety.

BACKGROUND ART

In a process of watching a video, a user can perform a click operation on the like button via a like button or may perform a collection operation via a collection button in a video application (APP) on the video currently played by the application.

Nowadays, as Bluetooth devices advance, a user usually watches a video using a Bluetooth device. In the process of watching the video, the user can perform operations such as play and pause on the currently played video via the Bluetooth device, but the user cannot perform other operations on the currently played video via the Bluetooth device.

SUMMARY OF THE INVENTION

In view of the above, the present application provides a method and an apparatus for implementing a video click based on a wireless (e.g., Bluetooth) device, a computer device, and a computer-readable storage medium, to solve the problem that some click operations cannot be implemented via the Bluetooth device in the prior art, but can be implemented only by a user manually clicking in an APP, causing inconvenience of operation.

The present application provides a method for implementing a video click based on a Bluetooth device, the method including:
  performing matching with and connection to the Bluetooth device;
  monitoring a signal sent by the Bluetooth device that succeeds in the matching and connection;
  parsing the monitored signal, to determine whether the monitored signal is associated with a preset power-conserving wireless personal area network, e.g., Bluetooth Low Energy (BLE), service;
  determining whether a terminal device is in a video playing state, if the monitored signal is the preset BLE service; and
  if the terminal device is in the video playing state, rendering a click operation on a video played in the terminal device, and updating data associated with the click operation.

Optionally, before the performing matching with and connection to the Bluetooth device, the method further includes:
  providing a device binding page, to allow a user to select a Bluetooth device to be bound to the terminal device via the device binding page; and
  obtaining the Bluetooth device to be bound to the terminal device that is selected by the user via the device binding page, and binding the selected Bluetooth device to the terminal device; and
  the performing matching with and connection to the Bluetooth device includes:
  performing the matching with and connection to the bound Bluetooth device.

Optionally, the providing a device binding page, to allow a user to select a Bluetooth device to be bound to the terminal device via the device binding page includes:
  providing the device binding page, and displaying Bluetooth devices that meet a preset condition via the device binding page, to allow the user to select the Bluetooth device to be bound to the terminal device from the Bluetooth devices that meet the preset condition via the device binding page.

Optionally, the parsing the monitored signal, to determine whether the monitored signal is a preset BLE service includes:
  parsing the monitored signal to obtain a BLE service;
  determining whether there is a preset characteristic value in at least one characteristic value included in the BLE service obtained through parsing; and
  determining that the monitored signal is the preset BLE service, if there is the preset characteristic value.

Optionally, the preset BLE service includes a first BLE service and a second BLE service, and the determining that the monitored signal is the preset BLE service, if there is the preset characteristic value includes:
  obtaining a value included in the preset characteristic value, if there is the preset characteristic value;
  determining that the monitored signal is the first BLE service, if the obtained value is a first preset value; and
  determining that the monitored signal is the second BLE service, if the obtained value is a second preset value.

Optionally, the click operation is a click operation on the like button or a long-press operation on the like button.

Optionally, when the click operation is the click operation on the like button, the rendering a click operation on a video played in the terminal device includes:
  converting the preset BLE service into a click instruction on the like button, and rendering the click operation on the like button on the video played in the terminal device according to the click instruction on the like button; and
  when the click operation is the long-press operation on the like button, the rendering a click operation on a video played in the terminal device includes:
  converting the preset BLE service into a long-press instruction on the like button, and rendering the long-press operation on the like button on the video played in the terminal device according to the long-press instruction on the like button.

Optionally, the updating data associated with the click operation includes:
  generating corresponding click data based on the click operation on the like button or the long-press operation on the like button, the click data including user information, video information, and a click type, and the click type including the click operation on the like button and the long-press operation on the like button;
  uploading the click data to a server, to allow the server to update user data of a user and video data of the video based on the click data; and
  receiving the updated video data and the updated user data returned by the server, and displaying the updated video data and the updated user data.

Optionally, the performing matching with and connection to the Bluetooth device includes:

monitoring whether there is a Bluetooth device accessing the terminal device; and sending, if it is monitored that the Bluetooth device accesses the terminal device, a matching and connection request to the Bluetooth device accessing the terminal device, to establish a communication connection to the Bluetooth device accessing the terminal device.

The present application further provides an apparatus for implementing a video click based on a Bluetooth device, the apparatus including:

a connecting module configured to perform matching with and connection to the Bluetooth device;

a monitoring module configured to monitor a signal sent by the Bluetooth device that succeeds in the matching and connection;

a parsing module configured to parse the monitored signal, to determine whether the monitored signal is a preset BLE service;

a determination module configured to determine whether a terminal device is in a video playing state, if the monitored signal is the preset BLE service; and a rendering module configured to: if the terminal device is in the video playing state, render a click operation on a video played in the terminal device, and update data associated with the click operation.

The present application further provides a computer device including a memory, a processor, and a computer program stored on the memory and capable of running on the processor, where when the processor executes the computer program, the steps of the method as described above are implemented.

The present application further provides a computer-readable storage medium having a computer program stored thereon, where when the computer program is executed by a processor, the steps of the method as described above are implemented.

The present application monitors the signal sent by the Bluetooth device, renders the click operation on the video played in the terminal device upon monitoring the preset BLE service, and updates the data associated with the click operation, so as to implement the click operation on the video played in the terminal device via the Bluetooth device, with no need for the user to perform the click in the video, which is convenient for user operation.

DETAILED DESCRIPTION OF EMBODIMENTS

The advantages of the present application are further described below with reference to accompanying drawings and specific embodiments.

Exemplary embodiments are illustrated in detail here, and examples thereof are shown in the accompanying drawings. When the following description refers to the figures, the same numerals in different figures represent the same or similar elements unless otherwise indicated. The implementations described in the following exemplary embodiments do not represent all implementations consistent with the present disclosure. Instead, they are merely examples of apparatuses and methods consistent with some aspects of the present disclosure as detailed in the appended claims.

The terms used in the present disclosure are merely for the purpose of describing specific embodiments, and are not intended to limit the present disclosure. The terms "a/an", "said" and "the" in the singular form used in the present disclosure and the appended claims are also intended to include the plural form unless otherwise clearly indicated in the context. It should also be understood that the term "and/or" used herein refers to and includes any or all possible combinations of one or more of the associated listed items.

It should be understood that although the terms, such as first, second, and third, may be used in the present disclosure to describe various types of information, such information should not be limited to these terms. These terms are merely used to distinguish the same type of information from one another.

For example, without departing from the scope of the present disclosure, first information may alternatively be referred to as second information, and similarly, second information may alternatively be referred to as first information. Depending on the context, the word "if" as used herein may be interpreted as "when" or "upon" or "in response to determining".

In the description of the present application, it should be understood that, the reference numerals of steps do not indicate the order of execution of the steps, but are merely to facilitate the description of the present application and differentiation between the steps, and thus will not be interpreted as limiting the present application.

Figure 1:
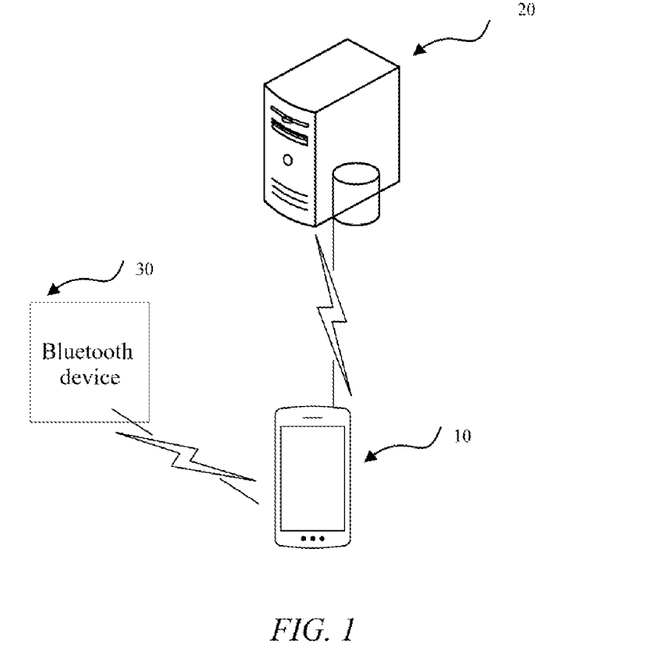
FIG. 1 is a schematic diagram showing an environment of a method for implementing a video click based on a Bluetooth device according to an embodiment of the present application.

FIG. 1 is a schematic diagram schematically showing an application environment of a method for implementing a video click based on a wireless (e.g., Bluetooth) device according to an embodiment of the present application. In an exemplary embodiment, a system of the application environment may include a terminal device 10, a server 20, and a Bluetooth device 30. There forms a wireless or wired connection between the terminal device 10 and the server 20. There forms a wired or wireless connection between the Bluetooth device 30 and the terminal device 10.

The terminal device 10 may be a mobile phone, an iPad, a tablet computer, etc. The server 20 may be one server or a server cluster constituted by a plurality of servers or a cloud computing center, which is not specifically limited herein. The Bluetooth device may be a wired or wireless headset. An application is installed in the terminal device 10 and can run program code of the method for implementing a video click based on the Bluetooth device, so as to perform a click operation on the like button for a video.

Figure 2:
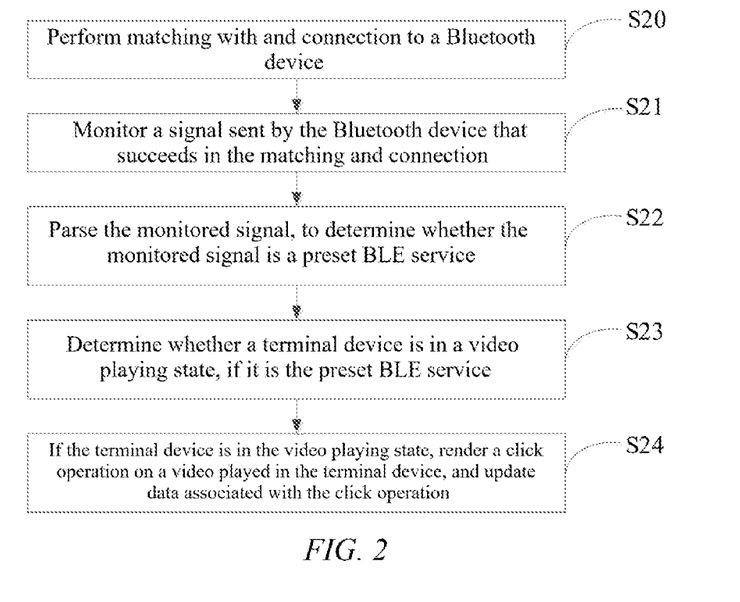
FIG. 2 is a flowchart of an embodiment of a method for implementing a video click based on a Bluetooth device according to the present application.

FIG. 2 is a schematic flowchart of a method for implementing a video click based on a Bluetooth device according to an embodiment of the present application. The method for implementing a video click based on the Bluetooth device of the present application is applied to a terminal device. It should be understood that the flowchart in this method embodiment is not intended to limit an execution order of the steps. As can be seen from the figure, the method for implementing a video click based on the Bluetooth device provided in this embodiment includes the following steps:

Step S20, matching with and connection to the Bluetooth device are performed.

Specifically, the Bluetooth device needs to perform matching with and connection to the terminal device before implementing a click operation on a video played in the terminal device. The Bluetooth device can implement the click operation on the video played in the terminal device only after the Bluetooth device has matched with the terminal device and established a communication connection to the terminal device.

Figure 3:
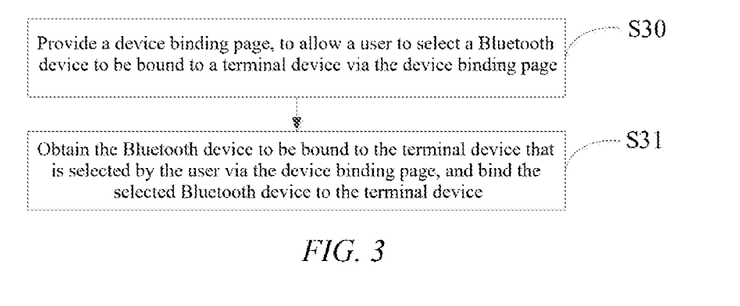
FIG. 3 is a flowchart of another embodiment of a method for implementing a video click based on a Bluetooth device according to the present application.

In an exemplary embodiment, referring to FIG. 3, to enable the terminal device to quickly and accurately find the Bluetooth device to be matched with and connected to, before the performing matching with and connection to the Bluetooth device, the method further includes the following steps:

Step S30, a device binding page is provided, to allow a user to select a Bluetooth device to be bound to the terminal device via the device binding page.

Specifically, there may be many Bluetooth devices in an environment where the terminal device is located. Therefore, to enable the terminal device to accurately find the Bluetooth device to be matched with and connected to, a device binding page may be provided. In this way, the user can select in advance the Bluetooth device to be bound to the terminal device via the device binding page.

In an exemplary embodiment, the providing a device binding page, to allow a user to select a Bluetooth device to be bound to the terminal device via the device binding page may include:

providing the device binding page, and displaying Bluetooth devices that meet a preset condition via the device binding page, to allow the user to select the Bluetooth device to be bound to the terminal device from the Bluetooth devices that meet the preset condition via the device binding page.

Specifically, the preset condition is a preset Bluetooth device screening condition, and the preset condition may be that there is a preset universally unique identifier (UUID).

In this embodiment, when providing the device binding page, all Bluetooth devices in the current environment of the terminal device are filtered. Only the Bluetooth devices that meet the preset condition are displayed on the device binding page, while those that do not meet the preset condition are not displayed on the device binding page. In this way, the number of Bluetooth devices displayed on the device binding page is greatly reduced, which makes it easier for the user to select the Bluetooth device to be bound to the terminal device on the device binding page.

It should be understood that to screen the Bluetooth devices based on the preset condition, in this embodiment, a UUID that meets the preset condition needs to be set for a Bluetooth device to be bound to the terminal device in factory settings.

Step S31, the Bluetooth device to be bound to the terminal device that is selected by the user via the device binding page is obtained, and the selected Bluetooth device is bound to the terminal device.

Specifically, after the user selects the Bluetooth device to be bound to the terminal device via the device binding page, a select instruction is triggered. The terminal device may obtain the Bluetooth device selected by the user according to the select instruction, and the selected Bluetooth device is bounded to the terminal device.

In an embodiment, after the user selects the Bluetooth device, in order to enhance security, the terminal device needs to verify the Bluetooth device selected by the user, to determine whether the Bluetooth device is a Bluetooth device that meets a criterion. Specifically, the terminal device may send an encrypted handshake request to the Bluetooth device selected by the user. After receiving the encrypted handshake request, the Bluetooth device, if meeting the criterion, decrypts the encrypted handshake request using a preset encryption protocol and returns decrypted data to the terminal device. After receiving the data returned by the Bluetooth device, the terminal device verifies the data. If the verification succeeds, it can be determined that the Bluetooth device is a Bluetooth device that meets the criterion, and can be bound to the terminal device. If the verification fails, it can be determined that the Bluetooth device is a Bluetooth device that fails to meet the criterion, and cannot be bound to the terminal device.

It should be noted that the verification operation in this embodiment may be performed by comparing whether received data that is returned by the Bluetooth device is the same as data before an application encrypts the handshake request. If the two are the same, the verification succeeds; and if the two are not the same, the verification fails.

In an exemplary embodiment, after the Bluetooth device is bound to the terminal device, when the terminal device needs to perform the matching with and connection to the Bluetooth device, the terminal device directly performs the matching with and connection to the bound Bluetooth device, with no need to attempt to perform the matching with and connection to the Bluetooth devices existing in the current environment of the terminal device one by one.

Figure 4:
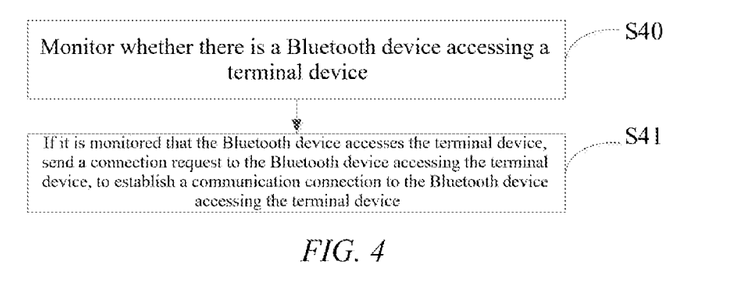
FIG. 4 is a flowchart of detailed steps of performing matching with and connection to a Bluetooth device according to an embodiment of the present application.

In an exemplary embodiment, referring to FIG. 4, the performing matching with and connection to the Bluetooth device includes the following steps:

Step S40, whether there is a Bluetooth device accessing the terminal device is monitored.

Specifically, a Bluetooth device accessing the terminal device means that the Bluetooth device has enabled a Bluetooth function, and can be detected by the terminal device.

In this embodiment, terminal devices using different operating systems have different ways to monitor whether a Bluetooth device accesses the terminal devices. When the terminal device is a device using an Android system, whether there is a Bluetooth device accessing the terminal device may be determined by monitoring Bluetooth broadcast. When the terminal device is a device using an IOS system, whether there is a Bluetooth device accessing the terminal device may be determined by monitoring a Bluetooth device change event.

Step S41, if it is monitored that the Bluetooth device accesses the terminal device, a connection request is sent to the Bluetooth device accessing the terminal device, to establish a communication connection to the Bluetooth device accessing the terminal device.

Specifically, when the terminal device monitors that there is a Bluetooth device accessing the terminal device, the terminal device actively sends a connection request to the Bluetooth device, to establish a communication connection to the Bluetooth device. Specifically, the terminal device may actively send encrypted data to the accessed Bluetooth device. After receiving the encrypted data, the Bluetooth device may decode the data, and then return the decoded data to the terminal device. After receiving the decrypted data returned by the Bluetooth device, the terminal device may compare the decoded data with the data that was used for the encryption. If the two are the same, the terminal device may establish the communication connection to the Bluetooth device.

It should be noted that when there are a plurality of Bluetooth devices accessing the terminal device, the terminal device sends a connection request to the accessed Bluetooth devices one by one. When the terminal device has established a communication connection to a certain Bluetooth device, it indicates that the terminal device has been matched with and connected to the Bluetooth device, and will no longer send connection requests to the other accessed Bluetooth devices.

Step S21, a signal sent by the Bluetooth device that succeeds in the matching and connection is monitored.

Specifically, after being matched with and connected to the Bluetooth device, the terminal device may monitor a wireless signal sent by the Bluetooth device, to determine whether the signal is associated with a preset power-conserving wireless personal area network, e.g., Bluetooth Low Energy (BLE) service.

Step S22, the monitored signal is parsed, to determine whether the monitored signal is a preset BLE service.

Specifically, after monitoring the signal sent by the Bluetooth device, the terminal device parses the monitored signal, to determine whether the monitored signal is associated with the preset BLE service based on the data obtained through parsing.

The BLE service is a medium used by the Bluetooth device to transmit data. The Bluetooth device may transmit data through a plurality of BLE services, each of which is configured to transmit one type of data. Each BLE service may include a plurality of characteristic values. To facilitate operation, each characteristic value has a plurality of attributes, including one value and zero or more description symbols for describing the characteristic value. The description symbol may be a permission, a descriptor, a type, etc.

One characteristic value may be used to transmit one type of parameter. For example, one characteristic value may be used to transmit quantity of electricity information of the Bluetooth device, one characteristic value may be used to transmit a temperature value of the Bluetooth device, and one characteristic value may be used to transmit behavior data generated based on a click operation on the like button and/or a long-press operation on the like button triggered by a user.

The preset BLE service is a customized BLE service configured to transmit behavior data generated by the user performing the click operation in the Bluetooth device on the video played in the terminal device.

Figure 5:
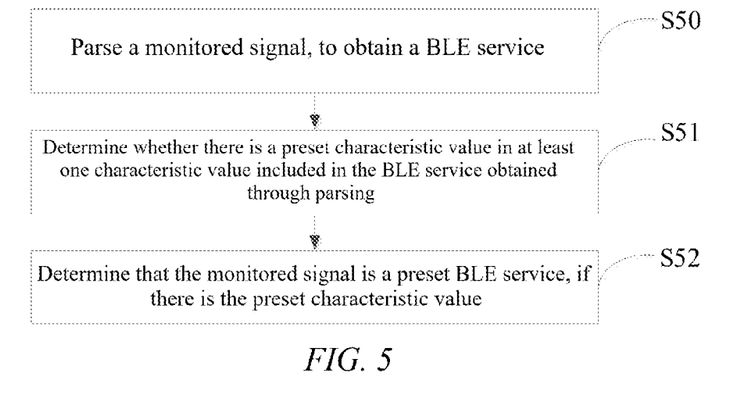
FIG. 5 is a flowchart of detailed steps of parsing a monitored signal, to determine whether the monitored signal is a preset BLE service according to an embodiment of the present application.

In an exemplary embodiment, referring to FIG. 5, the parsing the monitored signal, to determine whether the monitored signal is a preset BLE service includes: step S50, parsing the monitored signal to obtain a BLE service; step S51, determining whether there is a preset characteristic value in at least one characteristic value included in the BLE service obtained through parsing; and step S52, determining that the monitored signal is the preset BLE service, if there is the preset characteristic value.

Specifically, the preset characteristic value is a parameter in the preset BLE service that is used for transmitting the behavior data generated based on the user performing the click operation in the Bluetooth device on the video played in the terminal device.

In this embodiment, when there is the preset characteristic value in the at least one characteristic value included in the BLE service obtained through parsing, it indicates that the user performs the click operation on the video played in the terminal device via the Bluetooth device. When there is no preset characteristic value in the at least one characteristic value included in the BLE service obtained through parsing, it indicates that the user does not perform the click operation on the video played in the terminal device via the Bluetooth device.

In an exemplary embodiment, the preset BLE service includes a first BLE service and a second BLE service.

The first BLE service is generated by the user performing a first click operation on the video played in the terminal device via the Bluetooth device, and the second BLE service is generated by the user performing a second click operation on the video played in the terminal device via the Bluetooth device. In this embodiment, the first click operation is the click operation on the like button, and the second click operation is the long-press operation on the like button.

Figure 6:
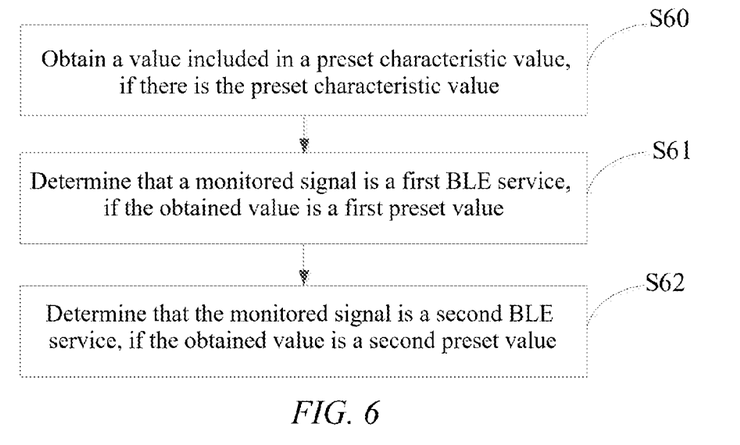
FIG. 6 is a flowchart of detailed steps of determining that a monitored signal is a preset BLE service, if there is a preset characteristic value according to an embodiment of the present application.

Referring to FIG. 6, the determining that the monitored signal is the preset BLE service, if there is the preset characteristic value includes: step S60, obtaining a value included in the preset characteristic value, if there is the preset characteristic value; step S61, determining that the monitored signal is the first BLE service, if the obtained value is a first preset value; and step S62, determining that the monitored signal is the second BLE service, if the obtained value is a second preset value.

Specifically, the value is data in the preset characteristic value that is used for characterizing whether the click operation triggered by the user via the Bluetooth device is the click operation on the like button or the long-press operation on the like button. The first preset value is a preset value used for characterizing that the user triggers the click operation on the like button. The first preset value may be set and adjusted according to an actual situation. For example, the first preset value is set to 1. The second preset value is a preset value used for characterizing that the user triggers the long-press operation on the like button. The second preset value may be set and adjusted according to an actual situation. For example, the second preset value is set to 2.

In this embodiment, when it is determined that the monitored signal is the preset BLE service, it indicates that the user triggers the click operation on the like button or the long-press operation on the like button via the Bluetooth device.

In an embodiment, the Bluetooth device may be preset. A first value is generated, when it is detected that the user triggers the like button disposed on the wireless (e.g., Bluetooth) device. For example, the generated first value is 1, indicating that the user triggers the click operation on the like button. A second value is generated, when it is detected that the user triggers the long-press operation on the like button disposed on the Bluetooth device. For example, the generated second value is 2, indicating that the user triggers the long-press operation on the like button.

After the Bluetooth device generates the first value or the second value, the first value or the second value is added into the preset characteristic value, so that the Bluetooth device can send the characteristic value to the terminal device through the preset BLE service.

It should be noted that the long press on the like button in the present application means clicking the like button, inserting coins, and performing collection for an entertainment work (such as a video).

Step S23, whether the terminal device is in a video playing state is determined if the monitored signal is the preset BLE service.

Specifically, if it is determined that the monitored signal is the preset BLE service, it is required to further determine a current state of the terminal device, so as to determine whether the terminal device is in the video playing state. The video playing state means that the terminal device is currently playing a video.

In this embodiment, the click operation on the like button is allowed to be performed only when the terminal device is in the video playing scene. However, the terminal device may not be in the video playing scene, when the user triggers the click operation on the like button via the Bluetooth device. Therefore, to avoid subsequent misoperations, it is required to determine whether the terminal device is currently in the video playing state.

In an embodiment, whether the terminal device is in the video playing scene may be determined by determining whether a current page is a video playing page. When the current page is the video playing page, it can be determined that the terminal device is in the video playing scene; and when the current page is not the video playing page, it can be determined that the terminal device is not in the video playing scene.

Step S24, if the terminal device is in the video playing state, the click operation on the video played in the terminal device is rendered, and data associated with the click operation is updated.

Specifically, the click operation is the click operation on the like button or the long-press operation on the like button. When the click operation is the click operation on the like button, the terminal device renders an effect image of the click operation on the like button on the video; and when the click operation is the long-press operation on the like button, the terminal device renders an effect image of the long-press operation on the like button on the video.

In an exemplary embodiment, when the click operation is the click operation on the like button, the rendering the click operation on the video played in the terminal device includes: converting the preset BLE service into a click instruction on the like button, and rendering the click operation on the like button on the video played in the terminal device according to the click instruction on the like button.

Specifically, to implement the click operation on the like button on the video, the terminal device needs to first convert the BLE service into the click instruction on the like button; then, the terminal device can perform the click operation on the like button on the played video based on the click instruction on the like button, and implement rendering of an effect of a click on the like button.

When the click operation is the long-press operation on the like button, the rendering the click operation on the video played in the terminal device includes:
converting the preset BLE service into a long-press instruction on the like button, and rendering the long-press operation on the like button on the video played in the terminal device according to the long-press instruction on the like button.

Specifically, to implement the long-press operation on the like button on the video, the terminal device needs to first convert the BLE service into the long-press instruction on the like button; then, the terminal device can perform the long-press operation on the like button on the played video based on the long-press instruction on the like button, and implement rendering of an effect of a long press on the like button.

In an exemplary embodiment, when the terminal device is not in the video playing scene, a prompt that the current scene does not support the video click operation may be provided.

As an example, the user may be prompted by voice that the current scene does not support the click operation on the like button or the long-press operation on the like button on the video. In this way, the user can know in time that he/she has falsely triggered the click operation on the like button or the long-press operation on the like button.

In an exemplary embodiment, after the click operation on the like button or the long-press operation on the like button is performed on the currently played video, the user may be prompted that the click on the like button or the long press on the like button succeeds.

As an example, the user may be prompted by voice that the click operation on the like button or the long-press operation on the like button succeeds. In this way, the user can know in time the condition in which he/she performs the click on the like button or the long press on the like button on the video.

The data associated with the click operation includes user data and video data.

The video data includes the number of times of the video that the user is currently watching. The user data includes liking behavior data, collection behavior data, and coin insertion behavior data of the user.

Figure 7:
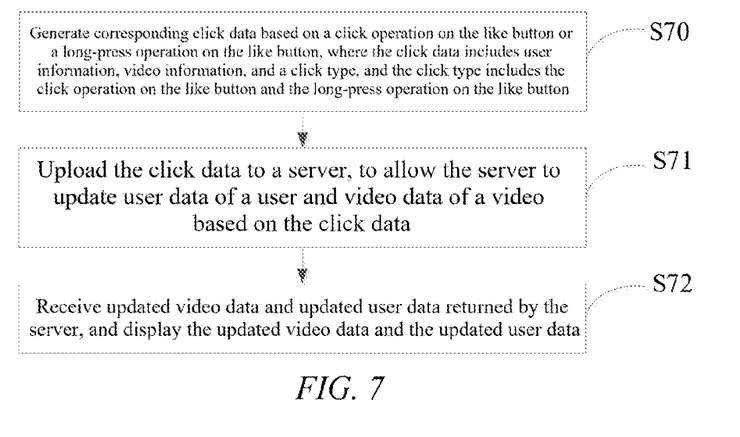
FIG. 7 is a flowchart of detailed steps of updating data associated with the click operation according to an embodiment of the present application.

In an exemplary embodiment, referring to FIG. 7, the updating data associated with the click operation includes the following steps:
Step S70, corresponding click data is generated based on the click operation on the like button or the long-press operation on the like button. The click data includes user information, video information, and a click type. The click type includes the click operation on the like button and the long-press operation on the like button.

Specifically, after the click operation on the like button or the long-press operation on the like button on the video is completed, to enable a back-end server to record the click operation on the like button or the long-press operation on the like button performed by the user on the video, in this embodiment, the corresponding click data is generated when the click operation on the like button or the long-press operation on the like button is completed. In the click data, the user information, the video information, and the click type may be recorded.

The user information is used for determining which user performs the click operation on the like button or the long-press operation on the like button on the video. The video information is used for determining which video the user performs the click operation on the like button or the long-press operation on the like button on.

The click type is used for determining whether the user currently performs the click operation on the like button or the long-press operation on the like button on the video.

Step S71, the click data is uploaded to a server, to allow the server to update the user data of the user and video data of the video based on the click data.

As an example, when the click data is generated based on the click operation on the like button, after receiving the click data, the server increments the number of likes of a video A the user is currently watching by one. For example, the video A previously had 10 likes given by all users. After receiving the click data, the server updates the number of likes of the video A to 11. At the same time, the server updates the user data of the user. That is, the user performs the click operation on the like button on the video A.

As an example, when the click data is generated based on the long-press operation on the like button, after receiving the click data, the server increments the number of likes of a video A the user is currently watching by one. For example, the video A previously had 10 likes given by all users. After receiving the click data, the server updates the number of likes of the video A to 11. At the same time, the server updates the user data of the user. That is, the user performs the click operation on the like button and the collection operation on the video A, and at the same time, the server decrements the number of coins owned by the user by one. For example, if the user previously owned 10 coins, then he/she owns nine coins after the updating.

Step S72, the updated video data and the updated user data returned by the server are received, and the updated video data and the updated user data are displayed.

Specifically, after updating the user data and the video data, the server returns the updated user data and the updated video data to the terminal device. In this way, the terminal device can display the updated video data and the updated user data on a page.

The present application monitors the signal sent by the Bluetooth device, renders the click operation on the video played in the terminal device upon monitoring the preset BLE service, and updates the data associated with the click operation, so as to implement the click operation on the video played in the terminal device via the Bluetooth device, with no need for the user to perform the click in the video, which is convenient for user operation.

Figure 8:
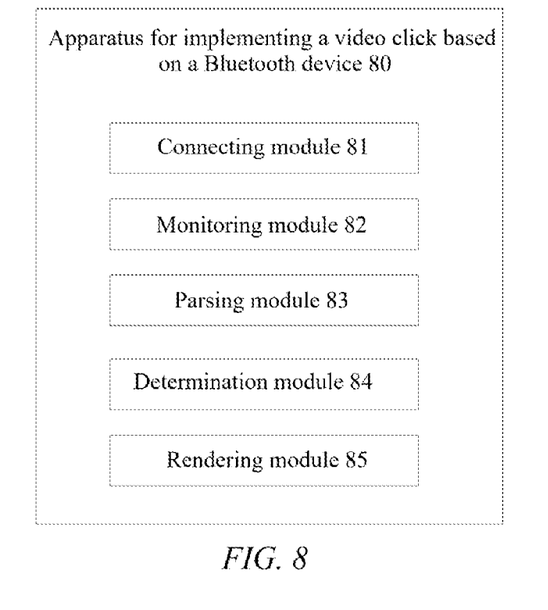
FIG. 8 is a diagram of program modules in an embodiment of an apparatus for implementing a video click based on a Bluetooth device according to the present application.

FIG. 8 is a diagram of program modules in an embodiment of an apparatus 80 for implementing a video click based on a Bluetooth device according to the present application.

In this embodiment, the apparatus 80 for implementing a video click based on the Bluetooth device may include a series of computer program instructions stored on a memory. When the computer program instructions are performed by a processor, the function for implementing a video click based on the Bluetooth device according to each embodiment of the present application can be implemented. In some embodiments, based on the specific operations implemented by various parts of the computer program instructions, the apparatus 80 for implementing a video click based on the Bluetooth device may be divided into one or more modules, which are specifically as follows:

a connecting module 81 configured to perform matching with and connection to the Bluetooth device;

a monitoring module 82 configured to monitor a signal sent by the Bluetooth device that succeeds in the matching and connection;

a parsing module 83 configured to parse the monitored signal, to determine whether the monitored signal is a preset BLE service;

a determination module 84 configured to determine whether a terminal device is in a video playing state, if the monitored signal is the preset BLE service; and a rendering module 85 configured to: if the terminal device is in the video playing state, render a click operation on a video played in the terminal device, and update data associated with the click operation.

In an exemplary embodiment, the apparatus 80 for implementing a video click based on the Bluetooth device further includes a providing module and an obtaining module.

The providing module is configured to provide a device binding page, to allow a user to select a Bluetooth device to be bound to the terminal device via the device binding page.

The obtaining module is configured to obtain the Bluetooth device to be bound to the terminal device that is selected by the user via the device binding page, and bind the selected Bluetooth device to the terminal device.

The connecting module 81 is further configured to perform the matching with and connection to the bound Bluetooth device.

In an exemplary embodiment, the providing module is further configured to provide the device binding page, and display Bluetooth devices that meet a preset condition via the device binding page, to allow the user to select the Bluetooth device to be bound to the terminal device from the Bluetooth devices that meet the preset condition via the device binding page.

In an exemplary embodiment, the parsing module 83 is further configured to parse the monitored signal to obtain a BLE service; determine whether there is a preset characteristic value in at least one characteristic value included in the BLE service obtained through parsing; and determine that the monitored signal is the preset BLE service, if there is the preset characteristic value.

In an exemplary embodiment, the preset BLE service includes a first BLE service and a second BLE service, and the parsing module 83 is further configured to obtain a value included in the preset characteristic value, if there is the preset characteristic value; determine that the monitored signal is the first BLE service, if the obtained value is a first preset value; and determine that the monitored signal is the second BLE service, if the obtained value is a second preset value.

In an exemplary embodiment, the click operation is a click operation on the like button or a long-press operation on the like button.

In an exemplary embodiment, the rendering module 85 is further configured to convert the preset BLE service into a click instruction on the like button, and render the click operation on the like button on the video played in the terminal device according to the click instruction on the like button.

The rendering module 85 is further configured to convert the preset BLE service into a long-press instruction on the like button, and render the long-press operation on the like button on the video played in the terminal device according to the long-press instruction on the like button.

In an exemplary embodiment, the rendering module 85 is further configured to generate corresponding click data based on the click operation on the like button or the long-press operation on the like button, the click data including user information, video information, and a click type, and the click type including the click operation on the like button and the long-press operation on the like button;

upload the click data to a server, to allow the server to update user data of a user and video data of the video based on the click data; and receive the updated video data and the updated user data returned by the server, and display the updated video data and the updated user data.

In an exemplary embodiment, the connecting module 81 is further configured to monitor whether there is a Bluetooth device accessing the terminal device; and send, if it is monitored that the Bluetooth device accesses the terminal device, a matching and connection request to the Bluetooth device accessing the terminal device, to establish a communication connection to the Bluetooth device accessing the terminal device.

The present application monitors the signal sent by the Bluetooth device, renders the click operation on the video played in the terminal device upon monitoring the preset BLE service, and updates the data associated with the click operation, so as to implement the click operation on the video played in the terminal device via the Bluetooth device, with no need for the user to perform the click in the video, which is convenient for user operation.

Figure 9:
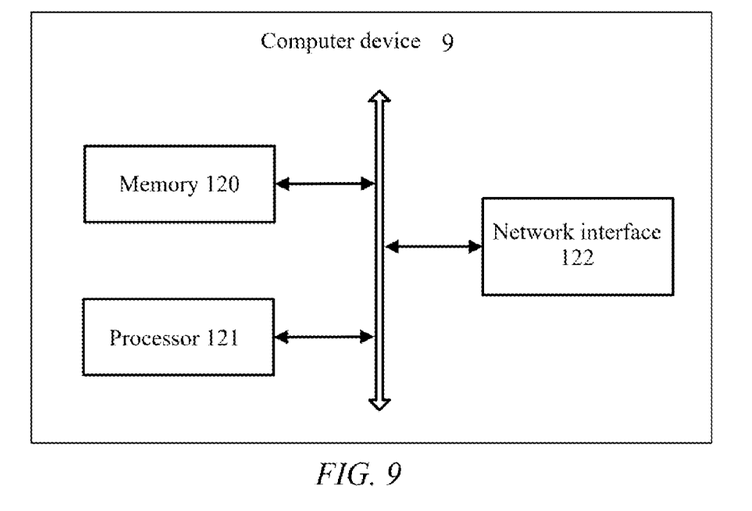
FIG. 9 is a schematic diagram of a hardware structure of a computer device that performs a method for implementing a video click based on a Bluetooth device according to an embodiment of the present application.

FIG. 9 is a schematic diagram schematically showing a hardware architecture of a computer device 9 applied to a method for implementing a video click based on a Bluetooth device according to an embodiment of the present application. In this embodiment, the computer device 9 is a device that can automatically perform numerical calculation and/or information processing according to preset or pre-stored instructions. For example, the computer device may be a tablet computer, a notebook computer, a desktop computer, a rack server, a blade server, a tower server, a cabinet server (including an independent server, or a server cluster composed of a plurality of servers), etc. As shown in FIG. 9, the computer device 9 at least includes, but is not limited to, a memory 120, a processor 121, and a network interface 122 that can be communicatively connected to each other through a system bus.

The memory 120 includes at least one type of computer-readable storage medium. The readable storage medium may be volatile or non-volatile. Specifically, the readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 120 may be an internal storage module of the computer device 9, for example, a hard disk or memory of the computer device 9. In some other embodiments, the memory 120 may alternatively be an external storage device of the computer device 9, for example, a plug-in type hard disk equipped on the computer device 9, a smart media card (SMC for short), a secure digital (SD for short) card, or a flash card. Certainly, the memory 120 may alternatively include both the internal storage module of the computer device 9 and the external storage device of the computer device 9. In this embodiment, the memory 120 is generally configured to store an operating system and various application software installed in the computer device 9, such as program code for the method for implementing a video click based on the Bluetooth device. In addition, the memory 120 may be configured to temporarily store various types of data that have been output or are to be output.

The processor 121 may be, in some embodiments, a central processing unit (CPU for short), a controller, a microcontroller, a microprocessor, or other chips for implementing a video click based on the Bluetooth device. The processor 121 is generally configured to control overall operation of the computer device 9, for example, execute control, processing, and the like related to data exchange or communication with the computer device 9. In this embodiment, the processor 121 is configured to run program code stored in the memory 120 or to process data.

The network interface 122 may include a wireless network interface or a wired network interface. The network interface 122 is generally configured to establish a communication link between the computer device 9 and other computer devices. For example, the network interface 122 is configured to connect the computer device 9 to an external terminal by using a network, and establish a data transmission channel, a communication link, and the like between the computer device 9 and the external terminal. The network may be a wireless or wired network, such as Intranet, Internet, the Global System for Mobile Communications (GSM for short), wideband code division multiple access (WCDMA for short), a 4G network, a 5G network, Bluetooth, or Wi-Fi.

It should be noted that FIG. 9 shows only a computer device having components 120 to 122, but it should be understood that not all of the illustrated components are required to be implemented, and more or fewer components may be implemented instead.

In this embodiment, the method for implementing a video click based on the Bluetooth device stored in the memory 120 may be divided into one or more program modules and executed by one or more processors (by the processor 121 in this embodiment) to implement the present application.

An embodiment of the present application provides a computer-readable storage medium having a computer program stored thereon, where when the computer program is executed by a processor, the steps of the method for implementing a video click based on the Bluetooth device are implemented.

In this embodiment, the computer-readable storage medium includes a flash memory, a hard disk, a multimedia card, a card-type memory (for example, an SD or DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of the computer device, for example, a hard disk or memory of the computer device. In some other embodiments, the computer-readable storage medium may alternatively be an external storage device of the computer device, for example, a plug-in type hard disk equipped on the computer device, a smart media card (SMC for short), a secure digital (SD for short) card, or a flash card. Certainly, the computer-readable storage medium may alternatively include both the internal storage unit of the computer device and the external storage device of the computer device. In this embodiment, the computer-readable storage medium is generally configured to store an operating system and various application software installed in the computer device, such as program code for the method for implementing a video click based on the Bluetooth device in the embodiments. In addition, the computer-readable storage medium may be configured to temporarily store various types of data that have been output or are to be output.

The apparatus embodiments described above are merely exemplary, where units illustrated as separate components may be or may not be physically separated, and the components illustrated as units may be or may not be physical units. That is, the components may be positioned at one place or distributed on at least two network units. The object of the solutions in the embodiments of the present application can be achieved by selecting some or all of the modules therein according to actual needs. Those of ordinary skill in the art can understand and implement the solutions without any creative effort.

Through the descriptions of the above implementations, those of ordinary skill in the art can clearly understand that the implementations can be implemented by software and general hardware platforms. Definitely, the implementations can also be implemented by hardware. Those of ordinary skill in the art can understand that all or some of the procedures in the methods of the foregoing embodiments can be implemented by a computer program to instruct related hardware. The program can be stored in a computer-readable storage medium. The program, when executed, may include the procedures in the above method embodiments. The storage medium may be a magnetic disk, an optical disc, a read-only memory (ROM), or a random access memory (RAM).

Finally, it should be noted that the above embodiments are merely used for illustrating rather than limiting the technical solutions of the present application. Although the present application is described in detail with reference to the foregoing embodiments, those of ordinary skill in the art should understand that the technical solutions specified in the above embodiments can still be modified, or some or all of the technical features therein can be equivalently substituted; and such modifications or substitutions do not make the essence of the corresponding technical solutions depart from the scope of the technical solutions of the embodiments of the present application.

What is claimed is:

1. A method, comprising:
performing matching with and connection to a wireless device;
monitoring a signal sent by the wireless device;
parsing the signal and determining whether the signal is associated with a preset power-conserving wireless personal area network service;
determining whether a terminal device is in a state of playing a video in response to determining that the signal is associated with the preset power-conserving wireless personal area network service;
in response to determining that the terminal device is in the state of playing the video, rendering an effect on the video played by the terminal device based on the signal and updating data based on the signal; and
wherein the method further comprises:
converting the preset power-conserving wireless personal area network service into a click instruction corresponding to a click operation on a like button of the wireless device, and rendering the effect on the video played by the terminal device according to the click instruction, or
converting the preset power-conserving wireless personal area network service into a long-press instruction corresponding to a long-press operation on the like button, and rendering the effect on the video played by the terminal device according to the long-press instruction.

2. The method according to claim 1, wherein before the performing matching with and connection to the wireless device, the method further comprises:
presenting a page of binding devices, the page configured to allow a user to select at least one wireless device to be bound with the terminal device; and
binding the at least one wireless device selected by the user via the page with the terminal device, wherein the wireless device is among the at least one wireless device bound with the terminal device.

3. The method according to claim 2, wherein the presenting a page of binding devices further comprises:
displaying wireless devices that meet a preset condition on the page, wherein the at least one wireless device is selected from the wireless devices that meet the preset condition.

4. The method according to claim 1, wherein the parsing the signal and determining whether the signal is associated with a preset power-conserving wireless personal area network service further comprises:
determining whether a preset characteristic value exists in at least one characteristic value comprised in a service obtained based on parsing the signal; and
determining that the signal is associated with the preset power-conserving wireless personal area network service in response to determining that there exists the preset characteristic value.

5. The method according to claim 4, further comprising:
determining that the signal is associated with a first power-conserving wireless personal area network service when the preset characteristic value comprises a first preset value, wherein the first preset value is generated by the wireless device based on a first operation performed on the wireless device; and
determining that the signal is associated with a second power-conserving wireless personal area network service when the preset characteristic value comprises a second preset value, wherein the second preset value is generated by the wireless device based on a second operation performed on the wireless device.

6. The method according to claim 5, wherein the first operation comprises a click operation on a like button of the wireless device, and the second operation comprises a long-press operation on the like button.

7. The method according to claim 1, wherein the updating data based on the signal further comprises:
generating click data based on the signal, wherein the click data comprise user information, video information, and information indicative of a click type, and wherein the click type comprises a click operation on a like button of the wireless device and a long-press operation on the like button;
uploading the click data to a server so as to update user data of a user and video data of the video based on the click data; and
receiving the updated video data and the updated user data returned by the server, and displaying the updated video data and the updated user data.

8. The method according to claim 1, wherein the performing matching with and connection to the wireless device further comprises:
monitoring whether the wireless device accesses the terminal device; and
sending a matching and connection request to the wireless device and establishing a communication connection with the wireless device in response to detecting that the wireless device accesses the terminal device.

9. A computing device, comprising:
at least one processor; and
at least one memory communicatively coupled to the at least one processor and comprising computer-readable instructions that upon execution by the at least one processor cause the at least one processor to perform operations comprising:
performing matching with and connection to a wireless device;
monitoring a signal sent by the wireless device;
parsing the signal and determining whether the signal is associated with a preset power-conserving wireless personal area network service;
determining whether a terminal device is in a state of playing a video in response to determining that the signal is associated with the preset power-conserving wireless personal area network service;
in response to determining that the terminal device is in the state of playing the video, rendering an effect on the video played by the terminal device based on the signal and updating data based on the signal; and
wherein the operations further comprise:
converting the preset power-conserving wireless personal area network service into a click instruction corresponding to a click operation on a like button of the wireless device, and rendering the effect on the video played by the terminal device according to the click instruction, or
converting the preset power-conserving wireless personal area network service into a long-press instruction corresponding to a long-press operation on the like button, and rendering the effect on the video played by the terminal device according to the long-press instruction.

10. The computing device according to claim 9, wherein the parsing the signal and determining whether the signal is associated with a preset power-conserving wireless personal area network service further comprises:
determining whether a preset characteristic value exists in at least one characteristic value comprised in a service obtained based on parsing the signal; and
determining that the signal is associated with the preset power-conserving wireless personal area network service in response to determining that there exists the preset characteristic value.

11. The computing device according to claim 10, the operations further comprising:
determining that the signal is associated with a first power-conserving wireless personal area network service when the preset characteristic value comprises a first preset value, wherein the first preset value is generated by the wireless device based on a first operation performed on the wireless device; and
determining that the signal is associated with a second power-conserving wireless personal area network service when the preset characteristic value comprises a second preset value, wherein the second preset value is generated by the wireless device based on a second operation performed on the wireless device.

12. The computing device according to claim 11, wherein the first operation comprises a click operation on a like button of the wireless device, and the second operation comprises a long-press operation on the like button.

13. The computing device according to claim 9, wherein the updating data based on the signal further comprises:
generating click data based on the signal, wherein the click data comprise user information, video information, and information indicative of a click type, and wherein the click type comprises a click operation on a like button of the wireless device and a long-press operation on the like button;
uploading the click data to a server so as to update user data of a user and video data of the video based on the click data; and
receiving the updated video data and the updated user data returned by the server, and displaying the updated video data and the updated user data.

14. The computing device according to claim 9, wherein the performing matching with and connection to the wireless device further comprises:
monitoring whether the wireless device accesses the terminal device; and
sending a matching and connection request to the wireless device and establishing a communication connection with the wireless device in response to detecting that the wireless device accesses the terminal device.

15. A non-transitory computer-readable storage medium, storing computer-readable instructions that upon execution by a processor cause the processor to implement operations comprising:
performing matching with and connection to a wireless device;
monitoring a signal sent by the wireless device;
parsing the signal and determining whether the signal is associated with a preset power-conserving wireless personal area network service;
determining whether a terminal device is in a state of playing a video in response to determining that the signal is associated with the preset power-conserving wireless personal area network service;
in response to determining that the terminal device is in the state of playing the video, rendering an effect on the video played by the terminal device based on the signal and updating data based on the signal; and
wherein the operations further comprise:
converting the preset power-conserving wireless personal area network service into a click instruction corresponding to a click operation on a like button of the wireless device, and rendering the effect on the video played by the terminal device according to the click instruction, or
converting the preset power-conserving wireless personal area network service into a long-press instruction corresponding to a long-press operation on the like button, and rendering the effect on the video played by the terminal device according to the long-press instruction.

16. The non-transitory computer-readable storage medium according to claim 15, the operations further comprising:
determining that the signal is associated with a first power-conserving wireless personal area network service based on a first preset value, wherein the first preset value is generated by the wireless device based on a first operation performed on the wireless device; and
determining that the signal is associated with a second power-conserving wireless personal area network service based on a second preset value, wherein the second preset value is generated by the wireless device based on a second operation performed on the wireless device.

17. The non-transitory computer-readable storage medium according to claim 15, wherein the updating data based on the signal further comprises:

generating click data based on the signal, wherein the click data comprise user information, video information, and information indicative of a click type, and wherein the click type comprises a click operation on a like button of the wireless device and a long-press operation on the like button;

uploading the click data to a server so as to update user data of a user and video data of the video based on the click data; and receiving the updated video data and the updated user data returned by the server, and displaying the updated video data and the updated user data.

\* \* \* \* \*